US009859955B2

(12) United States Patent
Keeling et al.

(10) Patent No.: US 9,859,955 B2
(45) Date of Patent: Jan. 2, 2018

(54) SYSTEM AND METHOD FOR POWER OUTPUT CONTROL IN WIRELESS POWER TRANSFER SYSTEMS

(71) Applicant: QUALCOMM Incorporated, San Diego, CA (US)

(72) Inventors: Nicholas A. Keeling, Auckland (NZ); Jonathan Beaver, Auckland (NZ); Michael Kissin, Auckland (NZ); Edward Van Boheemen, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 924 days.

(21) Appl. No.: 13/740,679

(22) Filed: Jan. 14, 2013

(65) Prior Publication Data

US 2014/0054970 A1   Feb. 27, 2014

Related U.S. Application Data

(60) Provisional application No. 61/692,908, filed on Aug. 24, 2012.

(51) Int. Cl.
*H04B 5/00* (2006.01)
*B60L 11/18* (2006.01)
(Continued)

(52) U.S. Cl.
CPC .......... *H04B 5/0037* (2013.01); *B60L 11/182* (2013.01); *B60L 11/1824* (2013.01);
(Continued)

(58) Field of Classification Search
None
See application file for complete search history.

(56) References Cited

U.S. PATENT DOCUMENTS 8,884,469 B2 * 11/2014 Lemmens ............... H02J 5/005
307/104
2004/0218406 A1   11/2004 Jang et al.
(Continued)

FOREIGN PATENT DOCUMENTS

CN   101904083 A   12/2010
CN   101978571 A    2/2011
(Continued)

OTHER PUBLICATIONS

International Search Report.And Written Opinion—PCT/US2013/056032—ISA/EPO—Jan. 2, 2014.
(Continued)

*Primary Examiner* — Jared Fureman
*Assistant Examiner* — Aqeel Bukhari
(74) *Attorney, Agent, or Firm* — Knobbe, Martens, Olson & Bear LLP (57) ABSTRACT

This disclosure provides systems, methods and apparatus for wireless power transfer and particularly wireless power transfer to remote system such as electric vehicles. In one aspect a circuit for wireless power transfer is provided. The circuit comprises an inductive element for receiving wireless power from a magnetic field associated with a wireless power transfer transmitter device. The circuit further comprises an output configured to be connected to a load. The circuit further comprises a voltage detector configured to detect the voltage across the load. The circuit further comprises at least one switching element between the inductive element and the output. The circuit further comprises a controller configured to maintain a current in the inductive element substantially constant as the voltage detected across the load varies.

26 Claims, 7 Drawing Sheets

(51) Int. Cl.
*H02J 5/00* (2016.01)
*H02J 7/02* (2016.01)
*H02J 17/00* (2006.01)

(52) U.S. Cl.
CPC ....... *B60L 11/1833* (2013.01); *B60L 11/1842* (2013.01); *B60L 11/1844* (2013.01); *B60L 11/1846* (2013.01); *H02J 5/005* (2013.01); *H02J 7/025* (2013.01); *H02J 17/00* (2013.01); *B60L 2200/12* (2013.01); *B60L 2200/22* (2013.01); *B60L 2210/10* (2013.01); *B60L 2210/30* (2013.01); *B60L 2210/40* (2013.01); *B60L 2270/147* (2013.01); *Y02E 60/721* (2013.01); *Y02T 10/7005* (2013.01); *Y02T 10/7072* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(56) References Cited

U.S. PATENT DOCUMENTS

| | | |
|---|---|---|
| 2008/0290738 A1 | 11/2008 | Greene et al. |
| 2009/0174263 A1 | 7/2009 | Baarman et al. |
| 2010/0110741 A1 | 5/2010 | Lin et al. |
| 2011/0116290 A1* | 5/2011 | Boys ................. H02J 5/005 363/65 |
| 2011/0266880 A1* | 11/2011 | Kim et al. ............. 307/104 |
| 2012/0169137 A1 | 7/2012 | Lisi et al. |
| 2012/0175967 A1 | 7/2012 | Dibben et al. |
| 2012/0235636 A1 | 9/2012 | Partovi |
| 2013/0002037 A1* | 1/2013 | Doi ........................ 307/104 |
| 2013/0106198 A1* | 5/2013 | Kuk et al. ............. 307/104 |

FOREIGN PATENT DOCUMENTS

| | | |
|---|---|---|
| CN | 101981780 A | 2/2011 |
| EP | 2822147 A1 | 1/2015 |
| JP | 2010088143 A | 4/2010 |
| WO | WO-2009081115 A1 | 7/2009 |
| WO | 2013129452 A1 | 9/2013 |

OTHER PUBLICATIONS

Moriwaki Y., et al., "A Study on Reduction of Reflected Power Using DC/DC Converter in Wireless Power Transfer System via Magnetic Resonant Coupling," IEE-Japan Industry Applications Society Conference, Japan, The Institute of Electrical Engineers of Japan, Sep. 6, 2011, ROMBUNNO, 2-10, 1-4.

Moriwaki Y., et al., "Basic Study on Reduction of Reflected Power Using DC/DC Converters in Wireless Power Transfer System via Magnetic Resonant Coupling," 2011 IEEE 33rd International Telecommunications Energy conference (INTELEC), IEEE, 2011-09, pp. 1-5.

* cited by examiner

SYSTEM AND METHOD FOR POWER OUTPUT CONTROL IN WIRELESS POWER TRANSFER SYSTEMS

CROSS REFERENCE TO RELATED APPLICATIONS

This application claims priority to and the benefit under 35 U.S.C. §119(e) to U.S. Provisional Patent Application No. 61/692,908 entitled "SYSTEM AND METHOD FOR POWER OUTPUT CONTROL IN WIRELESS POWER TRANSFER SYSTEMS" filed on Aug. 24, 2012, the disclosure of which is hereby incorporated by reference in its entirety.

FIELD

The present invention relates generally to wireless power transfer, and more specifically to devices, systems, and methods related to wireless power transfer to remote systems such as vehicles including batteries. More particularly, the present invention relates to controlling the duty cycle of a switching element in wireless power transfer receiver devices used in wireless power transfer systems.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure is a circuit for a wireless power receiver device. The circuit includes an inductive element configured to receive wireless power from a magnetic field associated with a wireless power transfer transmitter device, the received wireless power inducing an alternating current in the inductive element. The circuit also includes an output interface electrically coupled to the inductive element and configured to provide current to a load. The circuit also includes a controller configured to maintain a current in the inductive element substantially constant as a voltage across the load varies.

Another aspect of the disclosure is a method of wireless power transfer. The method includes receiving wireless power from a magnetic field associated with a wireless power transfer transmitter device, the received wireless power inducing an alternating current in an inductive element. The method also includes providing current to a load. The method also includes maintaining the alternating current in the inductive element substantially constant as a voltage detected across the load varies.

Another aspect of the disclosure is an apparatus for wireless power transfer. The apparatus includes means for receiving wireless power from a magnetic field associated with a wireless power transfer transmitter device, the received wireless power inducing an alternating current in an inductive element. The method also includes means for providing current to a load. The method also includes means for maintaining the alternating current in the inductive element substantially constant as a voltage detected across the load varies.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Inductive power transfer (IPT) systems are one means for the wireless transfer of energy. In IPT, a primary (or "base") power device transmits power to a secondary (or "pick-up") power receiver device. Each of the transmitter and receiver power devices includes inductive elements—typically coils or windings of electric current conveying media. An alternating current in the primary coil produces a varying electromagnetic field. When the coil of the pick-up is within the fluctuating electromagnetic field, an electromotive force (EMF) is induced, thereby transferring power to the pick-up.

Some IPT systems use resonant inductive coupling, in which power is transmitted between inductive coils that are tuned to resonate at a certain frequency. Resonant coupling may be achieved by adding inductive and/or capacitive elements in series or parallel with the induction coils.

In a resonant IPT system, the proportion of available power transferred to the pick-up is dependent on the degree of coupling between the primary and secondary coils. The greater the coupling, the more power is transferred to the secondary coil. The coupling coefficient may be defined as the fraction of flux of the primary coil that cuts the secondary coil, and is a function of the geometry of the system. The coupling coefficient is therefore dependent on the distance between the primary and secondary coils, and their alignment.

In wireless power transfer systems for charging electric vehicles using IPT there can be large variations in the level of coupling each time a vehicle is charged. The distance and alignment between the primary and secondary coils may vary based on the location of the coils and the positioning of the vehicle, on which the pick-up is mounted, with respect to the base. This variation in coupling can create difficulties when it comes to configuring the system to deliver optimal power to an electric vehicle battery.

In some existing IPT systems for charging electric vehicles, switching is performed in the power supply in the base to compensate for variation in coupling—varying the current in the primary coil in order to achieve a constant output current for a given voltage. In a poorly coupled system, the current in the primary coil may be substantially higher than the current in the primary coil in a closely coupled system to achieve the same current output from the secondary coil. Such variation in the current in the primary coil places significant stress on the power electronic components in the system, resulting in the need for more expensive componentry, reducing reliability and limiting operating range.

Moreover, in an electric vehicle the output voltage is set by the battery voltage which may vary more than 30% during charging. Where the system is limited to a constant power output, this voltage swing requires the base power supply to control the primary current accordingly in order to compensate. The resulting variation in power supply current amplifies the issues created due to variation in coupling.

Figure 1:
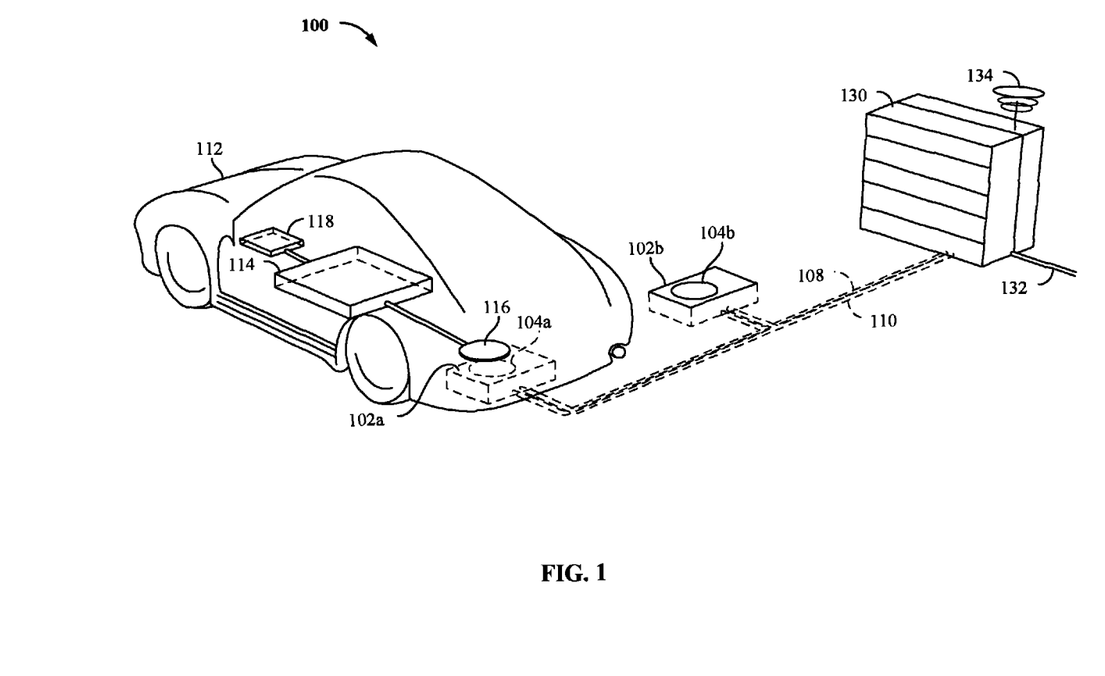
FIG. 1 is a diagram of an exemplary wireless power transfer system for charging an electric vehicle, in accordance with an exemplary embodiment of the invention.

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $1/2\pi$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zigzag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
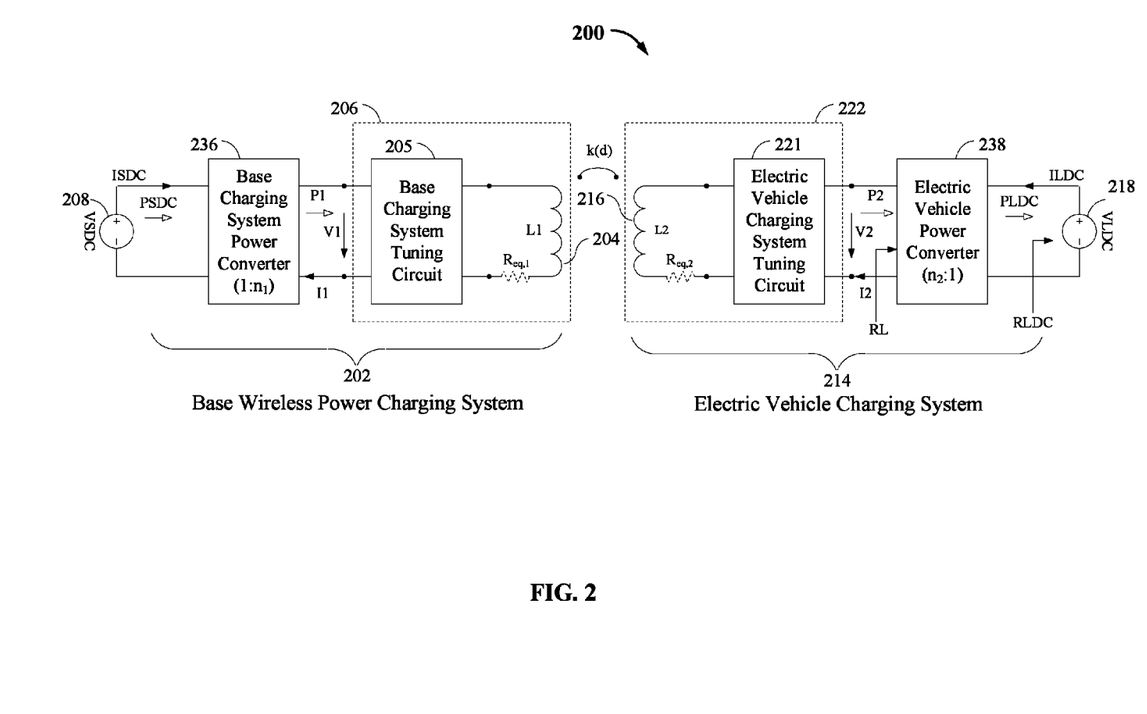
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, a capacitor may be added in series with the induction coil to create a resonant circuit (e.g., the base system transmit circuit 206) that generates an electromagnetic field. Accordingly, for larger diameter induction coils, the value of capacitance for inducing resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil.

The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including a base charging system tuning circuit 205 which may consist of reactive tuning components in a series or parallel configuration or a combination of both with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including an electric vehicle charging system tuning circuit 221 and electric vehicle induction coil 116. The electric vehicle charging system tuning circuit 221 may be provided to form a resonant circuit with the electric vehicle induction coil 216 that resonates at a desired frequency. The mutual coupling coefficient resulting at coil separation is represented by element k(d). Equivalent resistances $R_{eq.1}$ and $R_{eq.2}$ represent the losses that may be inherent to the induction coils 204 and 216 and any anti-reactance capacitors that may, in some embodiments, be provided in the base charging system tuning circuit 205 and electric vehicle charging system tuning circuit 221 respectively. The electric vehicle receive circuit 222 including the electric vehicle induction coil 316 and electric vehicle charging system tuning circuit 221 receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{Ldc}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to decouple the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy for coupling to another "coil." As used herein, coils 204 and 216 are examples of "power transfer components" of a type that are configured to wirelessly output, wirelessly receive, and/or wirelessly relay power. The coil may also be referred to as an "antenna" of a type that is configured to wirelessly output or receive power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
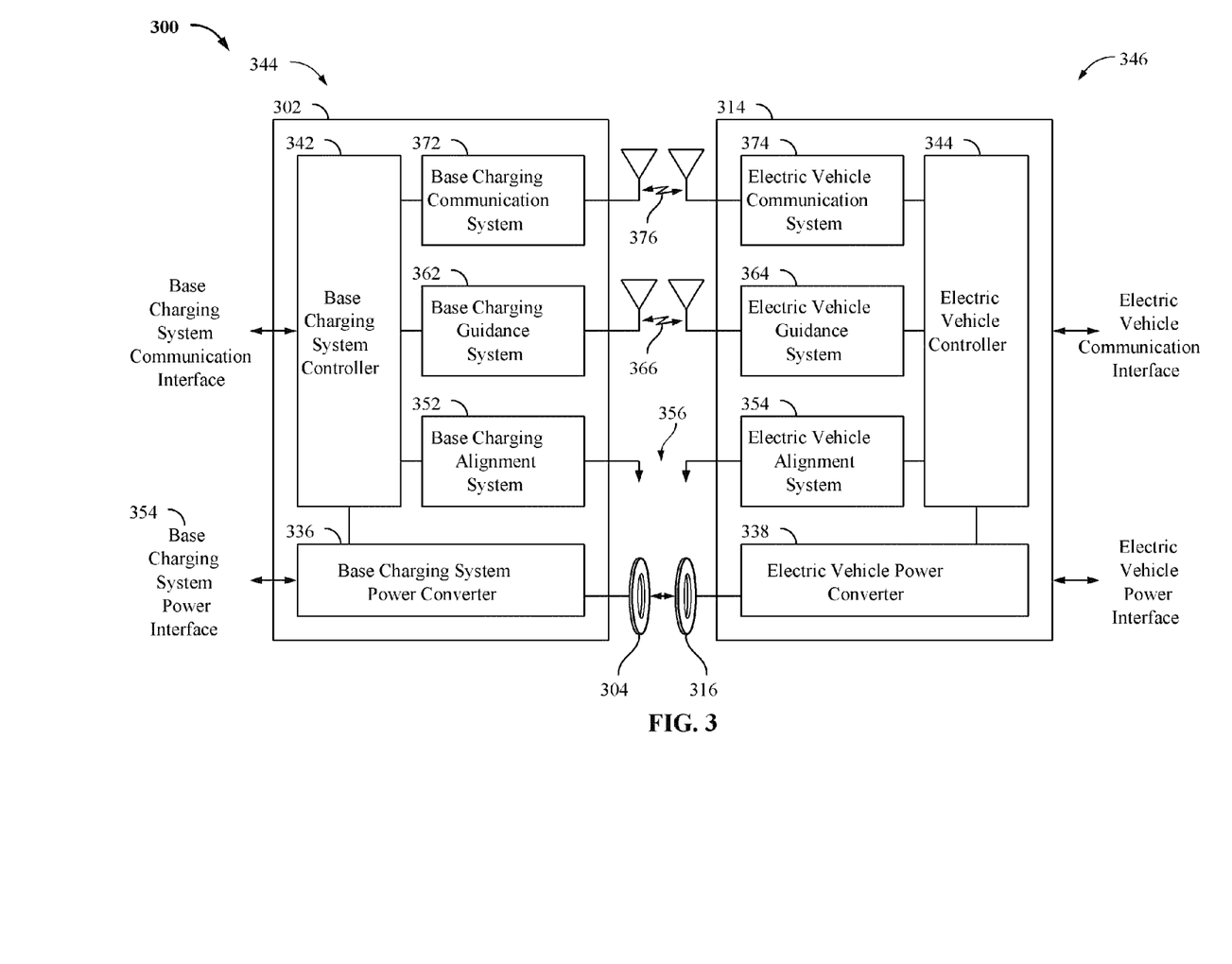
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
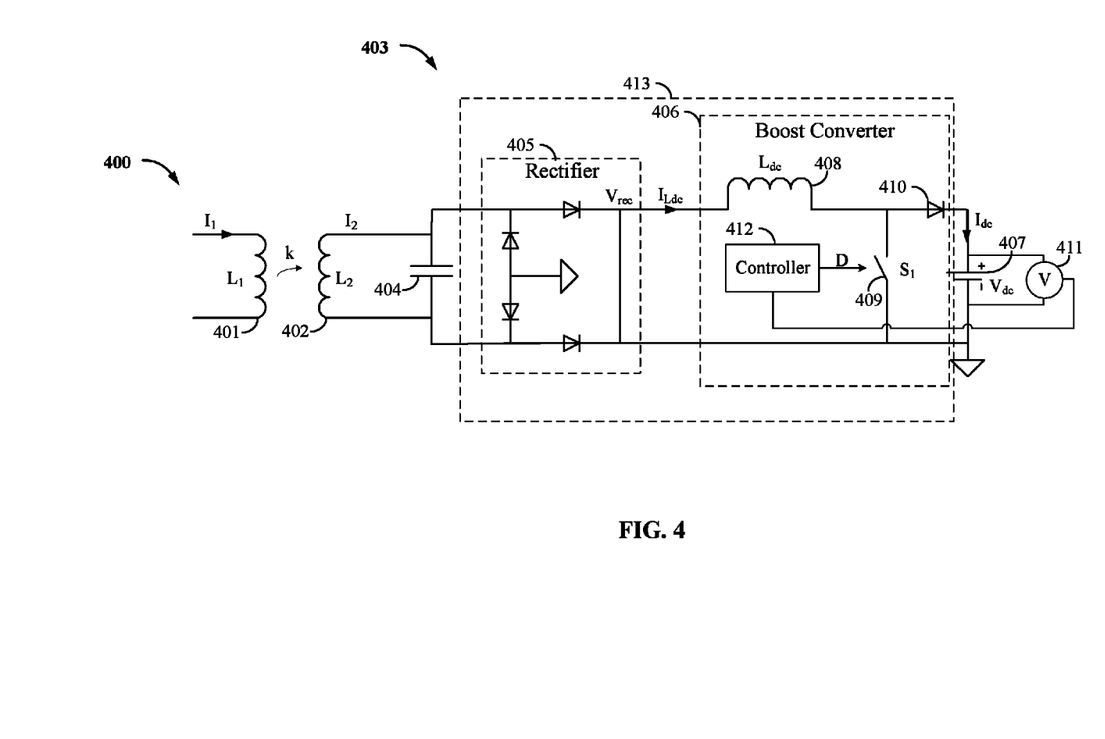
FIG. 4 is a schematic diagram of exemplary components of part of a wireless power transfer system according to an exemplary embodiment of the invention.

FIG. 4 is a schematic diagram of exemplary components of part of a wireless power transfer system, for example that shown in FIG. 2. A base system transmit circuit 400 comprises a primary inductive element, or first coil 401, having an inductance $L_1$ through which a base current $I_1$ passes. The first coil 401 may be inductively coupled to a secondary inductive element, or second coil 402, in the electric vehicle receive circuit 403, the second coil 402 having an inductance $L_2$. The level of coupling between the wireless power transmitter and receiver devices is represented by coupling coefficient k. When an alternating current is passed through coil 401, a voltage may be induced in the electric vehicle receive circuit 403, resulting in induced current $I_2$ passing through coil 402. The electric vehicle receive circuit 403 shown in FIG. 4 comprises a capacitive element 404 connected in parallel with second coil 402 for tuning purposes. The capacitive element 404 may comprise at least one capacitor.

In an electric vehicle charging situation, the level of coupling between the transmitter and receiver circuits may influence the current output from the resonant circuit formed from the secondary coil 402 and capacitive element 404 in the receive circuit 403 for a given base current $I_1$. As discussed above, the level of coupling may be determined by geometric factors such as the alignment of the coils in the transmitter and receiver circuits and the distance between them.

It may be desirable to aim for a particular output current to supply the load for any given electric vehicle charging system. The desired output current may suit the charging characteristics of a particular electric vehicle battery unit and may optimize the efficiency of the system. The desired output current may be a certain range of current values, within a given level of tolerance from the optimal output current.

One manner in which a desired output current can be achieved is by varying the base current $I_1$ passing through primary inductive element 401 as shown in FIG. 4. However, the difference in the level of coupling between a closely coupled scenario (which has a high coupling coefficient k) and a poorly coupled scenario (which has a low coupling coefficient k) may be significant, meaning a large variation in base current $I_1$ would be required to achieve the desired output current in the receive circuit 403 in all coupling scenarios. In addition, the maximum achievable base current limits the range of alignments the system can tolerate. Variation in the current in the first coil 401 may place significant stress on the power electronic components in the system, as well as reducing overall power efficiency of the system and presenting difficulties in optimizing design of the coils.

The electric vehicle receive circuit 403 further comprises a rectifier 405 configured to convert the alternating current induced in the second coil 402 into direct current. The rectifier 405 feeds into a boost converter 406, configured to control the power output to the load, in this case battery 407. The boost converter 406 comprises an inductive element 408 connected in series with the rectifier 405 through which rectifier 405 current $I_{Ldc}$ passes, a controllable switching element 409 connected in parallel across the battery 407 and a rectifying element, in this case diode 410, connected in series with the battery 407. It should be appreciated that the switching element may be any suitable means known to a person skilled in the art, for example a solid state device such as a MOSFET or IGBT. It is envisaged that, in exemplary embodiments where the frequency of the system is greater than approximately 20 kHz and voltages are less than substantially 600V, a MOSFET may be particularly suited to being used as a switching element—having lower switching losses than a IGBT in these conditions.

The voltage across the battery 407 is determined by a voltage detector 411. This voltage reading is provided to a controller 412, and used to determine the duty cycle of switching element 409. The rectifier 405, boost converter 406, and controller 412 may form a decoupling controller 413. The decoupling controller 413 may isolate the battery 407 from the remainder of the circuit; as a consequence, changes in the output voltage $V_{dc}$ of the battery 407 may not cause corresponding changes in the base current $I_1$. Some implementations maintain a substantially constant base current $I_1$ by maintaining rectifier 405 current $I_{Ldc}$, induced current $I_2$, and/or voltage across resonator 402 substantially constant notwithstanding variations in battery 407 output voltage $V_{dc}$.

Some of the benefits of decoupling variations in the output voltage $V_{dc}$ battery 407 from the remainder of the electric vehicle receive circuit 403 include increased efficiency, reduced design complexity, and reduced cost. In certain embodiments, it is easier to optimize secondary coil 402, and easier to design the system and its components when variations in battery 407 output voltage $V_{dc}$ results in fewer variations in rectifier 405 current $I_{Ldc}$, induced current $I_2$, and/or voltage across resonator 402.

The controller 412 controls the switching element 409 duty cycle to maintain voltage and/or current across the electric vehicle receive circuit 222 substantially constant. The switching element 409 duty cycle may be proportional to output current $I_{ds}$ and/or battery 407 output voltage $V_{dc}$. An advantage of maintaining a substantially constant base current $I_1$ is that wireless power transmitters may transmit power to multiple receivers at the same time, despite variations in battery voltages for individual receivers.

It should be appreciated that the function of controller 412 may be performed by an electric vehicle controller tasked with additional functions, such as controller 344 illustrated in FIG. 3, and need not be a dedicated controller or processor.

When an alternating base current $I_1$ is present in the exemplary embodiment of base circuit 400, the rectifier 405 current $I_{Ldc}$ may be approximated by:

$$I_{Ldc} = 1.1 I_1 k \sqrt{L_1/L_2} \tag{1}$$

where the 1.1 value is an approximation of the equivalent transfer ration through the rectifier. Theoretically, this value is:

$$\pi/(2\sqrt{2}), \tag{2}$$

The resulting output current $I_{dc}$ into the battery 407 is given by:

$$I_{dc} = (1-D) I_{Ldc}, \tag{3}$$

where D is the duty cycle for the on state of the switching element 409.

In an exemplary embodiment, D may be such that:

$$D = 1 - (V_{dc\_min}/V_{dc}) \quad (4)$$

(where $V_{dc\_min}$ is the minimum voltage seen by the battery 407; and $V_{dc}$ is the voltage presently seen by the battery 407).

As power flow is conserved through the converter 406:

$$P_{out} = V_{dc} I_{dc} \quad (5)$$

$$P_{out} = V_{dc}(1-D) I_{Ldc} \quad (6)$$

$$P_{out} = V_{dc}(V_{dc\_min}/V_{dc}) I_{Ldc} \quad (7)$$

$$P_{out} = V_{dc\_min} 1.1 I_1 k \sqrt{L_1/L_2} \quad (8)$$

where $P_{out}$ is the power output to the battery 407.

By controlling the output current $I_{dc}$ (and thus from the boost converter 406 based on the output voltage $V_{dc}$, the variation in voltage on the battery 407 can be effectively isolated from the power supply (not illustrated) providing base current $I_1$ to the base circuit 400. Without the requirement to compensate for changes in output current due to output voltage variation, the power supply current may be considered proportional to output power, and controlled accordingly. The demands on the power supply in terms of variation in base current $I_1$ may thus be reduced.

In addition to the flexibility of being able to control the output current based on battery voltage, further flexibility can be provided by varying the current in the base coil (for example, coil 401 of FIG. 4). While large changes in current in the base coil may be undesirable for the reasons mentioned above, some degree of variability is tolerable without adversely impacting the efficiency of the system. Varying the base current enables the output current to be varied for a given level of coupling. By independently adjusting both the base current and the duty cycle of the switching element, a greater degree of optimization is achievable than adjusting each alone.

Further, by decoupling the battery 407 from the transmit circuit 400 the effective DC voltage seen by the resonant circuit (capacitive element 404 connected in parallel with second coil 402) may be constant. Specifically, the voltage ($V_{rec}$) across the rectifier 405 may be given by:

$$V_{rec} = V_{dc}(1-D) \quad (9)$$

$$V_{rec} = V_{dc}(V_{d\_min}/V_{dc}) \quad (10)$$

$$V_{rec} = V_{d\_min} \quad (11)$$

It follows that the voltage across the resonant components are approximated by:

$$V_{L2} = 1.1 V_{d\_min} \quad (12)$$

This in turn means that the resonant currents may be constant. As a result, the losses may be more easily determined, and design of the receive circuit 403 (in particular the second coil 402) may be optimized for this resonant current and/or voltage.

Figure 5:
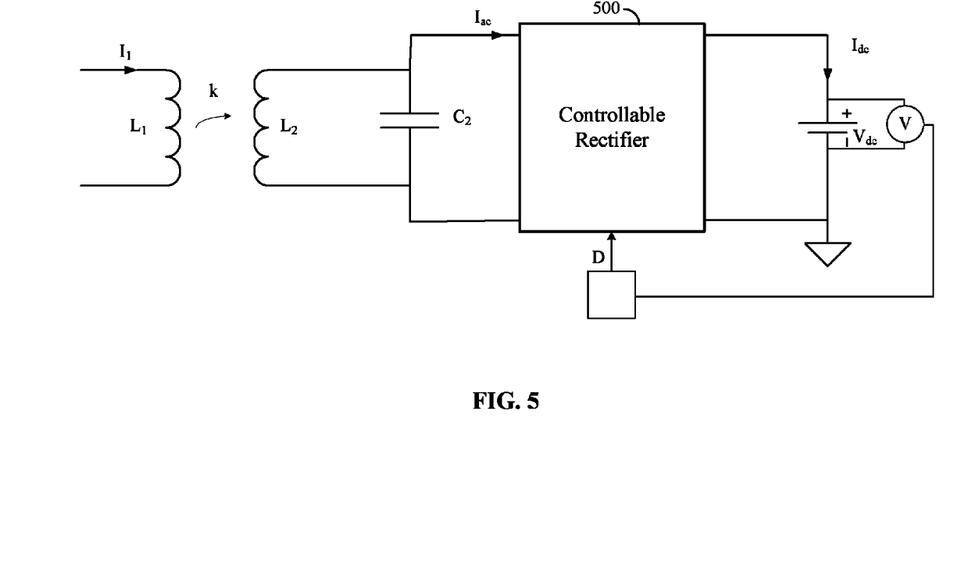
FIG. 5 is a schematic diagram of exemplary components of part of a wireless power transfer system according to an exemplary embodiment of the invention.

FIG. 5 is a schematic diagram of exemplary components of part of a wireless power transfer system according to an exemplary embodiment of the invention. The system shown in FIG. 5 is similar to FIG. 4, but has a controllable rectifier 500 substituted for the decoupling controller 413. The controllable rectifier 500 may include one or more controllable devices such as an SCR, the duty cycle of which may be controlled in accordance with the principles of the method outlined above.

Figure 6:
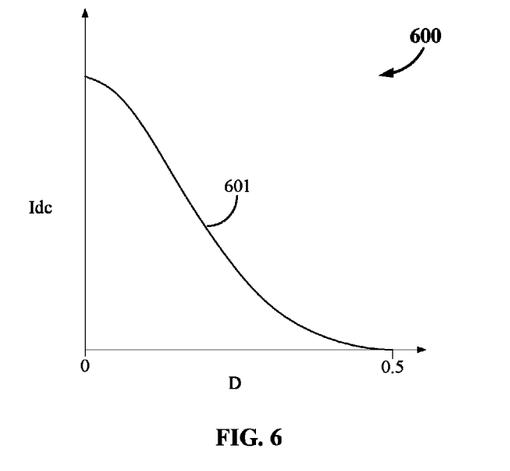
FIG. 6 is a graph illustrating output current against duty cycle according to an exemplary embodiment of the invention.

FIG. 6 is an exemplary graph 600 illustrating the relationship between output current $I_{dc}$ of the controllable rectifier 500 in the exemplary embodiment shown in FIG. 5, and duty cycle (D) of same. It may be seen that the curve 601 is non-linear with variation in D.

Figure 7:
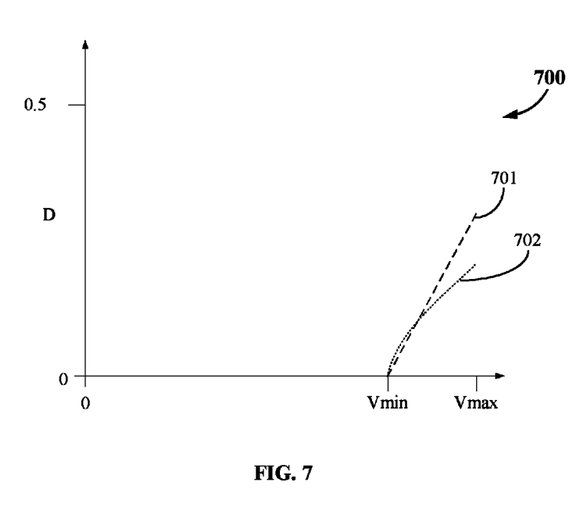
FIG. 7 is a graph illustrating expected duty cycle for a measured voltage according to an exemplary embodiment of the invention.

FIG. 7 is an exemplary graph 700 illustrating the relationship between duty cycle (D) and voltage output ($V_{dc}$) of the exemplary embodiments shown in FIG. 4 and FIG. 5. Curve 701 shows a linear relationship between D and Vdc for the embodiment of FIG. 4 comprising a decoupling controller 413. In contrast, it may be seen that curve 702, showing the relationship between D and Vdc for the embodiment of FIG. 5 comprising a controllable rectifier 500, is non-linear between $V_{min}$ and $V_{max}$.

It should be appreciated that while determination of a suitable duty cycle for the controllable rectifier 500 in the exemplary embodiment shown in FIG. 5 may not follow the formulae outline above in relation to FIG. 4, the same principles may apply. Exemplary means by which a suitable duty cycle is determined may be calculation using the measured battery voltage, or use of a look-up table.

It is envisaged that while the controllable rectifier 500 may not have the same performance with regard to regulation as the decoupling controller 413 due to the energy storage capabilities of the decoupling controller 413, this may be compensated for by reduced power losses in some applications due to the lower number of diodes in the conduction path.

Figure 8:
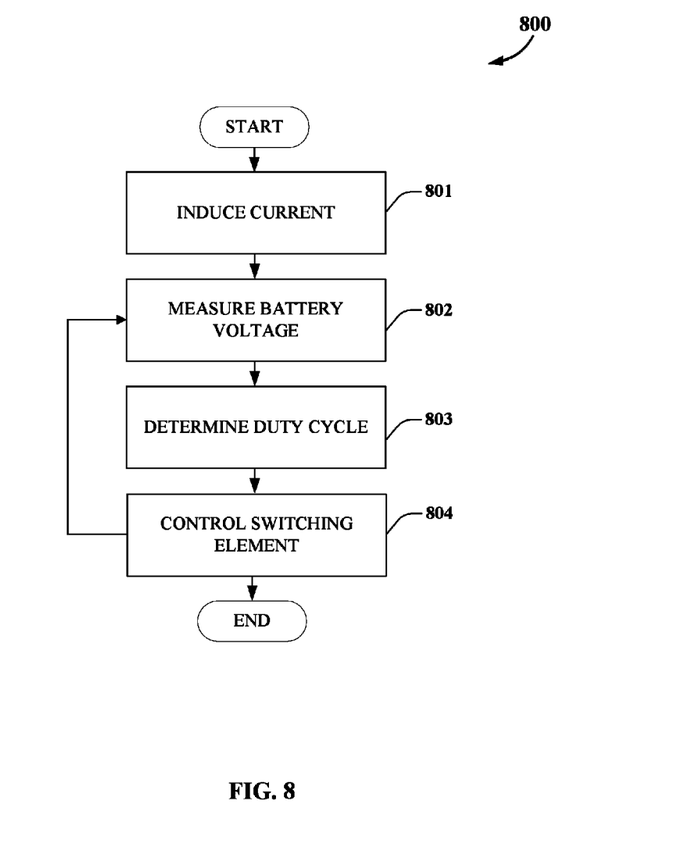
FIG. 8 is a flow diagram illustrating a method of controlling the power output from a wireless power transfer receiver device according to an exemplary embodiment of the invention.

FIG. 8 is a flow diagram illustrating a method 800 of controlling the power output from a wireless power transfer receiver device, such as that illustrated by FIG. 4, according to an exemplary embodiment of the invention.

At block 801 current is induced in the second coil 402 due to the presence of a magnetic field emitted from the first coil 401.

At block 802 the voltage across the battery 407 is measured by the voltage detector 411 and received by the controller 412.

At block 803 the controller 412 determines the duty cycle for the switching element 409 using the measured voltage from block 802. For example, in one embodiment the duty cycle D may be determined to be such that:

$$D = 1 - (V_{dc\_min}/V_{dc}). \quad (13)$$

At block 804 the controller switches the switching element 409 according to the duty cycle determined at block 803, and power is transferred to the battery 407.

In an exemplary embodiment the switching frequency may be set such that it is the same or higher than the resonant frequency of operation. In doing so, any harmonics in the switching may be absorbed by existing filters already used within the system.

In one embodiment, blocks 802 through 804 may be performed only once, after the base and receiver circuits have been aligned to have a minimum degree of coupling. It should be appreciated that this is not intended to be limiting, and that other embodiments are envisaged.

For example, the method may then loop back to block 802. In one embodiment this loop may be repeated in order to adjust for any changes in the battery 407 voltage and the subsequent changes in power demand. As the battery 407 voltage may be expected to vary significantly during charging—for example from 70 percent to 100 percent of maximum voltage in an exemplary electric vehicle battery—this readjustment may assist in reducing the corresponding change in base current.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A circuit for a wireless power receiver device, the circuit comprising:
    an inductive element configured to receive wireless power from a magnetic field associated with a wireless power transmitter device, the received wireless power inducing an alternating current in the inductive element;
    an output interface electrically coupled to the inductive element and configured to provide current to a load; and
    a controller configured to maintain a magnitude of the alternating current in the inductive element constant such that changes in a voltage across the load do not cause corresponding changes in the magnitude of the alternating current.

2. The circuit of claim 1, further comprising a voltage detector configured to detect the voltage across the load, wherein the controller is configured to isolate the load from the output interface circuit based on the detected voltage, to decouple variations in the voltage across the load from the inductive element.

3. The circuit of claim 2, further comprising at least one switching element electrically coupled between the inductive element and the output interface.

4. The circuit of claim 3, wherein the controller is configured to maintain a voltage across the inductive element constant based on the voltage across the load.

5. The circuit of claim 4, further comprising:
    a rectifier configured to convert the alternating current induced in the inductive element into a direct current; and
    a boost converter configured to receive the direct current from the rectifier and control power output to the load.

6. The circuit of claim 5, wherein the controller maintains the direct current from the rectifier constant based on the voltage across the load.

7. The circuit of claim 5, wherein the controller is configured to control a duty cycle of the switching element based on the voltage across the load.

8. The circuit of claim 7, wherein the duty cycle of the switching element is proportional to the voltage across the load.

9. The circuit of claim 5, the controller configured to maintain the direct current output from the rectifier constant based on the voltage across the load.

10. The circuit of claim 5, wherein the circuit comprises a decoupling controller comprising the switching element.

11. A method of wireless power transfer, the method comprising:
receiving wireless power from a magnetic field, the received wireless power inducing an alternating current in an inductive element;
providing current to a load based on the alternating current in the inductive element; and
maintaining a magnitude of the alternating current in the inductive element constant such that changes in a voltage across the load do not cause corresponding changes in the magnitude of the alternating current.

12. The method of claim 11, further comprising:
detecting the voltage across the load; and
isolating the load from the output interface circuit based on the detected voltage, to decouple variations in the voltage across the load from the inductive element.

13. The method of claim 12, further comprising maintaining a voltage across the inductive element constant based on the voltage across the load.

14. The method of claim 13, further comprising:
converting the alternating current induced in the inductive element into a direct current;
receiving the direct current; and
controlling power output to the load.

15. The method of claim 14, further comprising maintaining the direct current constant based on the voltage across the load.

16. The method of claim 14, further comprising controlling a duty cycle of a switching element based on the voltage across the load.

17. The method of claim 16, wherein the duty cycle of the switching element is proportional to the voltage across the load.

18. The method of claim 14, further comprising maintaining the direct current constant based on the voltage across the load.

19. An apparatus for wireless power transfer, the apparatus comprising:
means for receiving wireless power from a magnetic field associated with a wireless power transfer transmitter device, the received wireless power inducing an alternating current in an inductive element;
means for providing current to a load; and
means for maintaining a magnitude of the alternating current in the inductive element constant such that changes in a voltage across the load do not cause corresponding changes in the magnitude of the alternating current.

20. The apparatus of claim 19, further comprising means for detecting the voltage across the load, wherein the means for maintaining is further for isolating the load from the output interface circuit based on the detected voltage, to decouple variations in the voltage across the load from the inductive element.

21. The apparatus of claim 20, further comprising means for maintaining a voltage across the inductive element constant based on the voltage across the load.

22. The apparatus of claim 21, further comprising:
means for converting the alternating current induced in the inductive element into a direct current;
means for receiving the direct current; and
means for controlling power output to the load.

23. The apparatus of claim 22, further comprising means for maintaining the direct current constant based on the voltage across the load.

24. The apparatus of claim 22, further comprising means for controlling a duty cycle of a switching element based on the voltage across the load.

25. The apparatus of claim 24, wherein the duty cycle of the switching element is proportional to the voltage across the load.

26. The apparatus of claim 22, further comprising means for maintaining the direct current constant based on the voltage across the load.

\* \* \* \* \*